(No Model.)

W. D. MARTIN.
DUST PAN.

No. 443,327. Patented Dec. 23, 1890.

Witnesses:
L. M. Bartlett.
O. W. Johnson.

Inventor:
Wm. D. Martin
By W. A. Bartlett
Atty.

UNITED STATES PATENT OFFICE.

WILLIAM D. MARTIN, OF WARSAW, NEW YORK.

DUST-PAN.

SPECIFICATION forming part of Letters Patent No. 443,327, dated December 23, 1890.

Application filed April 2, 1890. Serial No. 346,291. (No model.)

*To all whom it may concern:*

Be it known that I, WILLIAM D. MARTIN, residing at Warsaw, in the county of Wyoming and State of New York, have invented certain new and useful Improvements in Dust-Pans, of which the following is a specification, reference being had therein to the accompanying drawings.

This invention relates to dust-pans, and especially to the handle or support for said pans and the connection of the handle to the body of the pan.

The object of the invention is to produce a dust-pan handle to which the pan may be swiveled, so as to turn up out of the way when the handle is set down or hung up; also, to make said handle capable of standing alone and to connect the handle to the pan by a device which permits of the swiveling of the pan.

Figure 1:
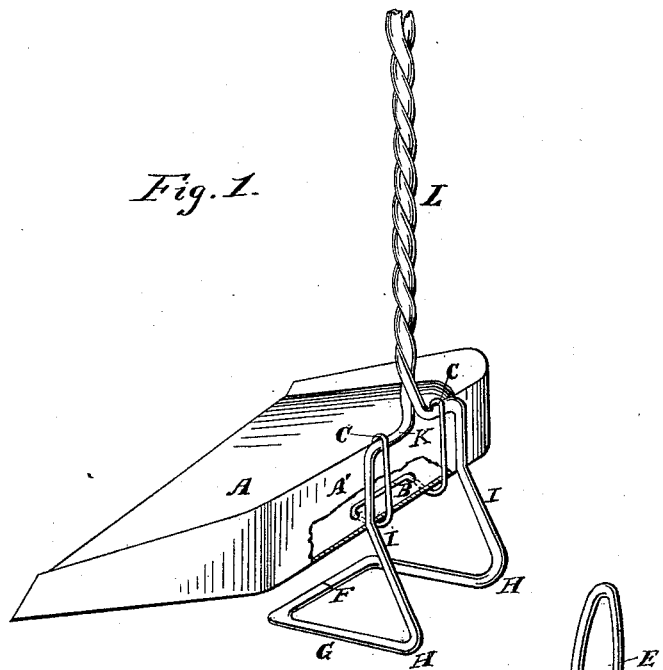
Figure 2:
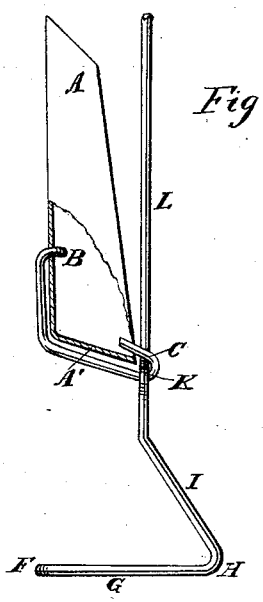
Figure 3:
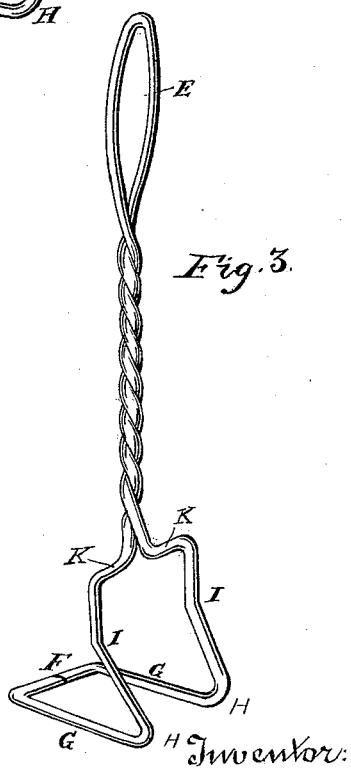

Figure 1 is a perspective view of the pan and handle, part of the pan broken away. Fig. 2 is an elevation of the handle and swivel. Fig. 3 is a perspective of the handle detached.

A indicates the body of the pan, which is of usual form. A wire B lies on the floor of the pan near the rear wall or fender A'. The wire B passes through holes in the floor A² and then back under the floor and upward behind the rear wall. The two ends of the wire are bent over, forming loops at the top of the rear wall of the pan, the extreme ends extending in front of said wall. The handle E is formed from wire, preferably twisted and of such length that a person can stand erect and hold the handle while the base of the handle rests on the floor. The base or support of the handle has a toe F, which extends under the rear portion of the pan when in use. The toe F is usually a single wire, and this wire is bent back at the sides, as at G G, to the heels H. These heels extend back far enough to keep the handle from falling over backward. The parts F G of the wire form an expanded base broad enough to support the handle in upright position, and when the pan is turned up, as in Fig. 2, the center of gravity falls within the circumference of the base, so that the pan will not fall over. From the heel H the wires turn upward at I and then turn toward each other at K and are twisted together at L to form the handle. The bars or wires K are about parallel with the toe F, and the loops C C, attached to the pan, encircle said bars K, forming a hinge. The toe F is far enough in front of the heel H to give a base to the handle, on which the handle will stand alone independently of its connection with the pan. By this means the pan may be turned up, as in Fig. 2, and set away at the side of the room without falling down, and as the handle is supported on its own base it does not strain or bend the thin sheet metal of the pan when allowed to stand alone.

The whole device consists of but three pieces. The handle is a single wire, the upright portion being twisted together and the base bent to shape, and the ends may be soldered at F, or the whole may be cast. The wire B serves to strengthen the pan as well as to form a hinge connection to the handle.

What I claim is—

1. The combination, with the pan, of a wire resting on the floor thereof, thence extending through holes in the floor, then up along the rear wall of the pan, and having the ends looped over in front of said wall, and a handle connected to said wire, substantially as described.

2. The combination, with a dust-pan, of a handle pivotally attached to the rear of the pan, said handle having an expanded base by which it may be supported in upright position independently of the pan, substantially as described.

3. The combination of the pan A, the wire B, having loops C C at the top of the rear wall of the pan, and the handle E, having offsets K, on which loops C C are hinged, and having a base-support under the rear of the pan, substantially as described.

In testimony whereof I affix my signature in presence of two witnesses.

WILLIAM D. MARTIN.

Witnesses:
A. B. BISHOP,
B. P. GAGE.